March 11, 1930. J. W. PIPPIN 1,750,490
DEVICE FOR SEPARATING WATER FROM OIL
Original Filed Oct. 19, 1927 2 Sheets-Sheet 2
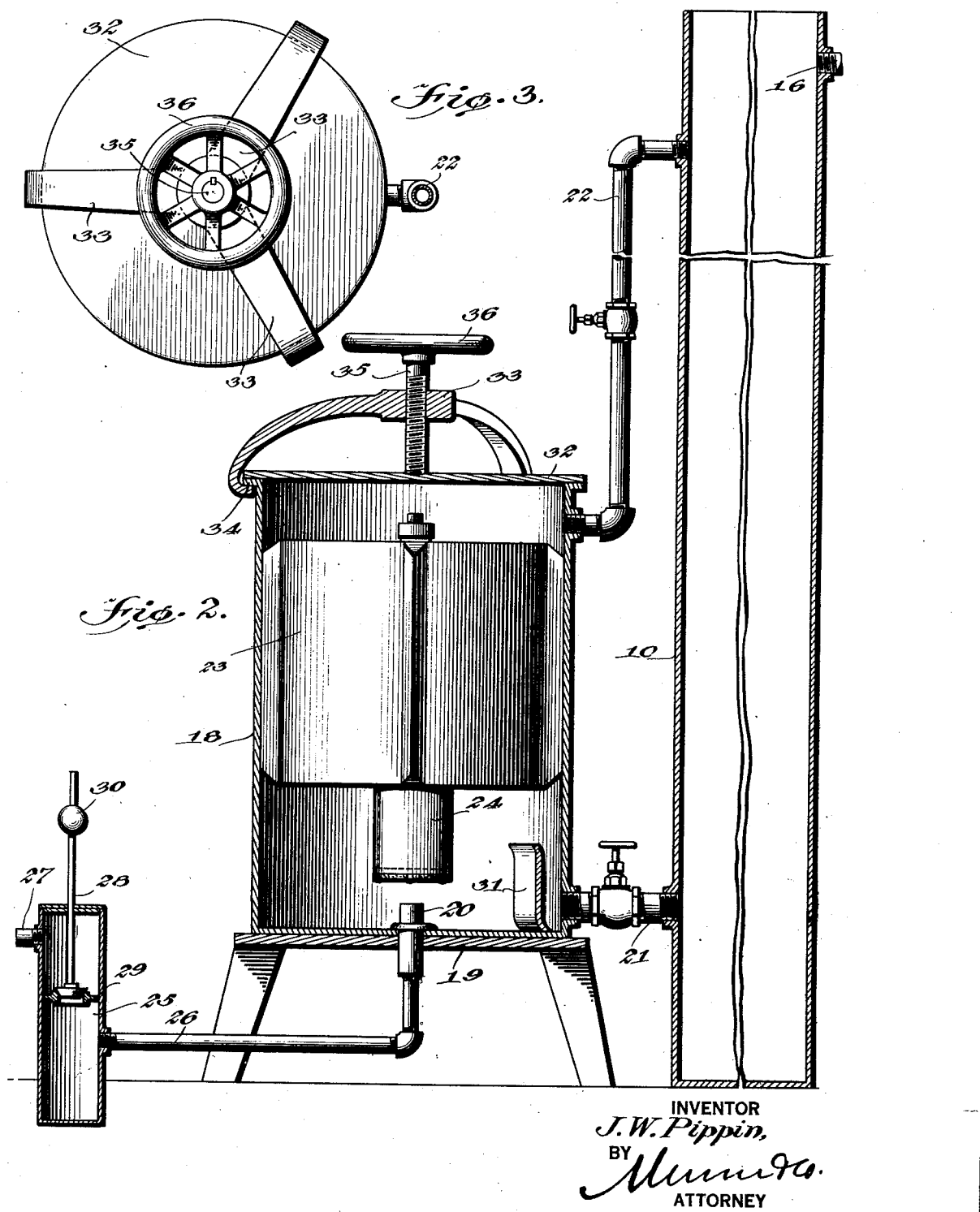
INVENTOR
J. W. Pippin,
BY
ATTORNEY Patented Mar. 11, 1930

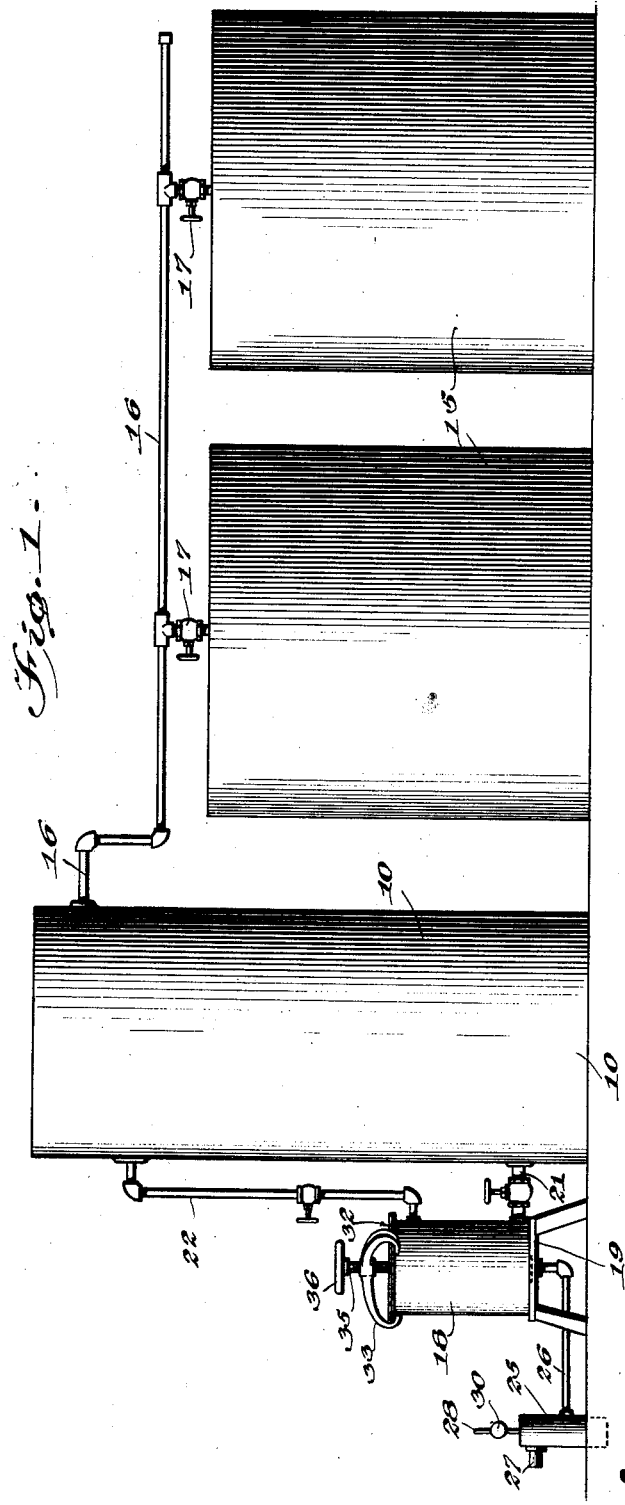

1,750,490

UNITED STATES PATENT OFFICE

JOHN W. PIPPIN, OF HEBBRONVILLE, TEXAS

DEVICE FOR SEPARATING WATER FROM OIL

Application filed October 19, 1927, Serial No. 227,250. Renewed September 7, 1929.

This invention relates to liquid separators and more particularly to liquid separators such as disclosed in my co-pending application, Serial #172,176, filed March 2, 1927.

An object of the invention is to obviate sticking of the float valve to its valve seat when closed and to generally improve the construction described and illustrated in the above referred to application.

The invention further provides means for causing the liquid to initially float in a vertical direction in the separator tank to obviate wasting the oil through the outlet incident to the velocity of the incoming liquid.

With the preceding and other objects and advantages in mind, the invention consists in the novel combination of elements, constructions and arrangements of parts to be hereinafter specifically referred to, claimed and illustrated in the accompanying drawings, wherein:

Figure 1 is a side elevation of the invention and a plurality of oil drums communicating therewith;

Figure 2 is a vertical sectional view; and

Figure 3 is a top plan view of the separator chamber.

Referring to the invention in detail a main tank or reservoir 10 is provided into which oil from the well is pumped in any suitable manner and which at its upper end has communication with a battery of receiving tanks 15 by way of an outlet pipe 16 equipped with control valves 17.

As is well known, oil in its crude or natural state contains a certain percentage of water and for the purpose of separating the oil from water before the former is conducted to the receiver tanks 15, a separating tank 18 mounted on a suitable pedestal 19 and having an outlet nipple 20 in its bottom, is provided. Adjacent its lower end a separator tank 18 has communication with the main tank 10 by way of a valve outlet pipe 21. A return pipe 22 leads from the upper end of the separator tank to the upper end of the main tank.

A float 23 equipped with a valve element 24 at its lower end is vertically movable in the separator tank and is so ballasted that it will float in water but submerge in oil or an emulsion of water and oil containing eighty percent water. It therefore follows that water flowing into the separating tank retains the float in raised position permitting the water to pass out of the nipple 20. However, as soon as the separator tank contains oil or the water and oil emulsion, the float quickly drops causing the valve element to seat and prevent the escape of this liquid from the separator tank. As the oil accumulates in the separator tank it passes into the pipe 22 and discharges into the main tank from whence it is carried off to the receiving tanks through the pipe 16.

Due to the accumulation of oil in the separator tank there will be down pressure on the float which will prevent raising of the latter should water again flow into the separator tank from the main tank unless the vacuum in the nipple is destroyed. To overcome this objection I provide a pressure chamber or cylinder 25 closed at both ends and having communication with the nipple 20 by way of a pipe 26. At its upper end this cylinder is provided with a water outlet opening 27. A reciprocable valve 28 adapted to seat on a valve seat 29 is vertically movable through the upper end of the cylinder and is normally retained on its seat by a weight 30 carried by the upper end of the valve stem. It will be observed that as long as the water passes from the separator tank into the cylinder 25 the valve 28 will be held above its seat allowing the discharge of water through the outlet 27.

When however, the separator tank contains oil or emulsion and the nipple is sealed by the valve element 24, the valve 28 is closed to sever communication between the atmosphere and separator tanks thereby preventing a vacuum from forming in the nipple 20. In this connection, it is pointed out that the valve 28 is held in open position as long as the liquid pressure passing through into the cylinder 25 is great enough. When the liquid pressure is insufficient to maintain the valve 28 raised, liquid will be trapped in the cylinder 25 below the valve seat 29 as well as in the pipe 26 precluding formation of atmospheric pressure below the valve element 24. It will be manifest that the float can readily rise against the weight or down pressure of the oil or emulsion above the same should water again enter the separator chamber.

Due to the velocity of the liquid passing into the separator tank some of the oil may escape through the nipple 20. To overcome this objection the incoming liquid is caused to travel in a vertical direction as it enters the separator tank by means of a vertically extending baffle plate 31 rising from the bottom of the separator tank in advance of the pipe 21.

It will be observed that the pipe 21 is of a greater diameter than the nipple 20 so that liquid will be discharged into the separator tank faster than it is discharged therefrom, thus causing the separator tank to be substantially full during the entire oil separating operation.

To permit the float to be readily removed from the separator tank, a removable closure 32 closes its upper end and is detachably held by means of a clamping spider 33 whose ends engage beneath an annular flange 34 upon the upper end of the separator tank. A vertically disposed screw 35, threadedly engaging the separator, normally bears against the closure to hold it in place and a hand wheel 36 is provided on the screw for the purpose of adjusting the same.

What is claimed is:

1. In an apparatus for separating liquids of different specific gravity, a separator tank having communication with a source of liquid supply and an outlet, a float valve in the separator tank for controlling the outlet and normally sustained in open position by liquid of one specific gravity but permitted to descend to close the outlet in liquid of a different specific gravity, and means normally sealing the outer end of the outlet to prevent vacuum therein and the consequent sticking of the float valve, such means being actuated to open the outlet to the atmosphere by liquid pressure from the separator tank when the float valve is open.

2. In an apparatus for separating liquids of different specific gravity a tank having an inlet for communication with a source of liquid supply and having an outlet pipe leading therefrom, a float valve in the tank normally sustained in open position by liquid of one specific gravity to permit the latter to pass through the discharge pipe, and means normally closing the discharge pipe to the atmosphere upon actuation of the float valve to closed position to prevent the production of vacuum in the discharge pipe and the consequent sticking of the float valve in closed position, such means permitting the discharge pipe to open to the atmosphere during the passage of liquid through said pipe.

3. In an apparatus for separating liquids of different specific gravity a tank having an inlet for communication with a source of liquid supply and having an outlet pipe leading therefrom, a float valve in the tank normally sustained in open position by liquid of one specific gravity to permit the latter to pass through the discharge pipe, a normally closed pressure opened valve closing the discharge pipe to the atmosphere to prevent the production of vacuum in the discharge pipe and the consequent sticking of the float valve when in closed position, and a conduit leading from the upper end of the tank for conducting liquid of one specific gravity therefrom.

4. In an apparatus for separating liquids of different specific gravity a tank having an inlet for communication with a source of liquid supply and having an outlet pipe leading therefrom, a float valve in the tank normally sustained in open position by liquid of one specific gravity to permit the latter to pass through the discharge pipe, a valve for closing the discharge pipe to the atmosphere upon actuation of the float valve to closed position to prevent the production of vacuum in the discharge pipe and the consequent sticking of the float valve in closed position, the valve being actuated to open position by liquid pressure in the discharge pipe while the float valve is in open position, and a baffle plate located in the tank to direct the liquid away from the outlet pipe.

5. In combination, a tank having an outlet pipe in its bottom, a float in the tank, a valve element carried by the float and adapted to seal one end of the pipe when the float is in lowered position, and a liquid pressure opened valve sealing the opposite end of the pipe when the float is in lowered position to prevent formation of vacuum in such pipe and thus obviate sticking of the valve element so that the float can readily rise in the tank.

6. In combination a main tank, a separator tank having an inlet and outlet communicating with the main tank and further provided with an outlet in its bottom, a casing communicating with the outlet and having communication with the atmosphere, a float valve in the separator tank and normally raised by liquid of one specific gravity to permit the passage of the latter into the casing, a valve in the casing normally held in open position incident to the passage of liquid therethrough but operated to closed position to prevent the formation of vacuum in the communication casing and outlet opening when the float valve closes, the liquid of one specific gravity circulating to the top of the main tank while the float valve is closed.

7. In combination a tank having an outlet conduit leading from its bottom, a pressure chamber communicating therewith and having an outlet opening at one end, a valve seat in the pressure chamber, a valve in the chamber and held in open position by the pressure in the pressure chamber, and a float valve in the tank normally held in raised position by liquid of one specific gravity to permit the latter to pass to the pressure chamber and discharge therefrom and allowed to close in liquid of the second specific gravity and means for returning the valve to closed position incident to the closing of the float valve to prevent sticking of the later.

Signed at Hebbronville, in the county of Jim Hogg and State of Texas this 5th day of October, A. D. 1927.

JOHN W. PIPPIN.